US009832715B2

(12) United States Patent
Bergman et al.

(10) Patent No.: US 9,832,715 B2
(45) Date of Patent: Nov. 28, 2017

(54) NETWORK-CONTROLLED NETWORK SELECTION PROCEDURE

(71) Applicant: Telefonaktiebolaget L M Ericsson (publ), Stockholm (SE)

(72) Inventors: Johan Bergman, Stockholm (SE); Erik Eriksson, Linköping (SE); Pål Frenger, Linköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 116 days.

(21) Appl. No.: 14/758,879

(22) PCT Filed: Jun. 24, 2013

(86) PCT No.: PCT/SE2013/050756
§ 371 (c)(1),
(2) Date: Jul. 1, 2015

(87) PCT Pub. No.: WO2014/109684
PCT Pub. Date: Jul. 17, 2014

(65) Prior Publication Data
US 2015/0341855 A1 Nov. 26, 2015

Related U.S. Application Data

(60) Provisional application No. 61/750,431, filed on Jan. 9, 2013.

(51) Int. Cl.
*H04W 4/00* (2009.01)
*H04W 48/18* (2009.01)
*H04W 48/16* (2009.01)

(52) U.S. Cl.
CPC .......... *H04W 48/18* (2013.01); *H04W 4/005* (2013.01); *H04W 48/16* (2013.01)

(58) Field of Classification Search
USPC .......... 370/232–252, 328–335; 455/435–522
See application file for complete search history.

(56) References Cited

U.S. PATENT DOCUMENTS 9,398,555 B2 * 7/2016 Watfa ............... H04W 60/04
9,474,017 B2 * 10/2016 Scribano .......... H04W 48/18
(Continued)

FOREIGN PATENT DOCUMENTS

WO WO 2011/100540 A1 8/2011
WO WO 2011 100540 A1 8/2011

OTHER PUBLICATIONS

3GPP TSG RAN WG2 #72bis; Dublin, Ireland; Source: QUALCOMM Incorporated; Title: Overload control by rejecting access attempts (R2-110046), Jan. 17-21, 2011.
(Continued)

*Primary Examiner* — Man Phan
(74) *Attorney, Agent, or Firm* — Baker Botts, LLP

(57) ABSTRACT

A radio network node (12) communicates with user equipments, UEs, (10) over a radio interface and estimates one or more quality factors, associated with each of a first and second network, that depend on a load or an expected UE behavior or an uplink channel quality for one or both of first and second networks. The node (12) determines one or more network selection parameters based on the estimated one or more quality factors, and communicates the one or more network selection parameters to at least one UE (10) for enabling the UE to select one of the first and second networks for subsequent access by the at least one UE. The UE receives from the radio network node one or more network selection parameters. The UE uses the one or more network selection parameters to select one of first and second radio networks and then accesses the selected radio network.

20 Claims, 10 Drawing Sheets

(56) References Cited

U.S. PATENT DOCUMENTS

| | | | |
|---|---|---|---|
| 9,521,005 B2* | 12/2016 | Kekki | H04W 48/18 |
| 2009/0061853 A1 | 3/2009 | Anschutz | |
| 2011/0151924 A1 | 6/2011 | Miller | |
| 2013/0003541 A1 | 1/2013 | Zakrzewski | |
| 2013/0143542 A1* | 6/2013 | Kovvali | H04W 48/18 455/418 |
| 2013/0235847 A1* | 9/2013 | Li | H04W 48/18 370/331 |
| 2015/0172998 A1* | 6/2015 | Tervonen | H04W 48/16 370/254 |
| 2015/0282058 A1* | 10/2015 | Forssell | H04W 48/18 455/552.1 |
| 2015/0312796 A1* | 10/2015 | Shikida | H04W 24/08 370/252 |
| 2015/0327153 A1* | 11/2015 | Tervonen | H04W 48/08 370/235 |
| 2016/0095050 A1* | 3/2016 | Lindheimer | H04W 48/16 455/435.2 |

OTHER PUBLICATIONS

PCT International Search Report for International application No. PCT/SE2013/050756, dated Apr. 3, 2014.

PCT International Preliminary Report on Patentability for International application No. PCT/SE2013/050756, dated Mar. 30, 2015.

Supplementary European Search Report for Application No. EP 13 87 0907—dated Aug. 9, 2016.

3rd Generation Partnership Project; Technical Specification Group Services and System Aspects; System Improvements for Machine-Type Communications (MTC) (Release 11); 3GPP TR 23.888 v11.0.0—Sep. 2012.

3rd Generation Partnership Project; Technical Specification Group Radio Access Network; Study on RAN Improvements for Machine-Type Communications (Release 10); 3GPP TR 37.868 v0.8.1—Aug. 2011.

Overload Control for Machine-Type-Communications in LTE-Advanced System; LTE-Advanced and 4G Wireless Communications: Part 2 by Ming-Yuan Cheng et al.; IEEE Communications Magazine—Jun. 2012.

* cited by examiner

NETWORK-CONTROLLED NETWORK SELECTION PROCEDURE

PRIORITY

This nonprovisional application is a U.S. National Stage Filing under 35 U.S.C. §371 of International Patent Application Serial No. PCT/SE2013/050756 filed Jun. 24, 2013, and entitled "Network-Controlled Network Selection Procedure" which claims priority to U.S. Provisional Patent Application No. 61/750,431 filed Jan. 9, 2013, both of which are hereby incorporated by reference in their entirety.

TECHNICAL FIELD

The technology relates to cellular radio communications and finds one non-limiting example to an Evolved Universal Terrestrial Radio Access Network (E-UTRAN) such as a fourth generation (4G) Long Term Evolution (LTE) network. In particular, the described embodiments relate to methods, apparatuses and a system for network-controlled network selection.

BACKGROUND

One example of an increasingly more popular type of UE is a Machine Type Communications (MTC) device. MTC devices run applications generating data that is typically delay-tolerant and oftentimes lower priority traffic as compared to non-MTC UEs. Because MTC devices are and will continue to be deployed in very high numbers, overload situations are expected to become more common. FIG. 1 illustrates one example of a communication network including a core network node such as a serving gateway (S-GW) 14, a plurality of base stations 12 referred to in LTE as eNodeBs (eNBs), and a large number of UE devices 10 including many MTC devices. Access to the wireless communication network may, for example, be by way of a contention-based random access channel (RACH). Base stations (eNBs) 12 provide radio network access to and from the UEs 10, and in LTE, collectively form a radio access network (RAN). The S-GW 14 connects to an external packet data network (PDN) such as the Internet via a PDN Gateway (PDN GW) 16. The UEs 10 may communicate with one or more servers, including one or more MTC servers 18, connected to the S-GW 14 or to the PDN GW 16 as shown. The cloud represents a communications network such as the Internet.

Machine Type Communications (MTC) traffic is defined as a specific type of wireless communication network traffic in the 3$^{rd}$ Generation Partnership Project (3GPP) Technical Specification 23.888, "System Improvements for Machine-Type Communications," the disclosure of which is incorporated herein by reference in its entirety. The term UE includes but is not limited to MTC devices that typically primarily collect and report data and/or non-MTC devices. One non-limiting example of an MTC device is a gas or power meter with a wireless transceiver for reporting at predetermined time periods, or event-based, the usage of gas or electrical power to the MTC server 18. Non-MTC devices are devices, such as a cell phone, smart phone, laptop computer, etc., used for voice and data communications by human users. While an MTC device may comprise a dedicated device specifically for data collection and reporting, a combined UE 10 may function part of the time as an MTC device and part of the time as a non-MTC device.

Both MTC devices and non-MTC devices all must contend with one another for access on the RACH. Due to the rapid growth of MTC devices, it is expected that the number of MTC devices will far exceed the number of non-MTC devices in the near future. Those large numbers will likely result in congestion, for example in the radio network, particularly when many of the MTC devices simultaneously try to access the network. Many such devices will likely transmit small amounts of uplink (UL) data (e.g., 100 bits) periodically (e.g., once per hour). For this type of data transfer, a network access procedure constitutes a significant part of the total signaling required to communicate the message. The time between each message is also typically long, and therefore, the UE may need to perform a new random access for each message it transmits, thereby degrading performance.

In LTE there are plans for enhanced MTC coverage with a target to improve the link budget, e.g., by approximately 20 dB as compared to what is supported with the legacy LTE standard. See 3GPP Technical document (Tdoc) RP-121441.

Networks seek to balance UE loads for both idle mode UEs and active mode UEs. For example, an idle mode UE may be instructed to camp on another network and an active mode UE may be instructed to perform an inter-Radio Access Technology (RAT) handover in an effort to reduce the current load in the currently-accessed network. But such load-balancing procedures may be insufficient. For example, even though UEs may be instructed to camp on a certain network and listen for paging messages from that network, there is no guarantee that the UE will use that same network when the UE needs to perform an UL network access.

UEs traditionally select a cell and a network based on UE measurements of base station/cell signals transmitted in the downlink (DL), which gives a good indication of the downlink quality that can be achieved in different cells and the networks that operate those cells. For MTC devices, it is often more relevant to select the network with the best uplink (UL) radio communications. For several reasons the UL and DL channel quality might be significantly different, and traditionally there has been no easy way for a particular UE to determine which network provides the best uplink (UL) radio communications. For example, different nodes may use different transmit power. Two signals reaching the UE with similar power might be transmitted with 20 dB difference in power or more. In this example situation, the uplink to one of the nodes (associated with the signal transmitted with weaker power) may also be 20 dB better or more. But the UE is unaware of this.

This problem is even more serious in a heterogeneous network deployment where low power base stations are in a sleep mode where they do not transmit any signals, even though they monitor random access channels in the uplink. Another example when the UE can not easily determine the UL quality is if one node has a much better receive antenna than another node. There might also be other subtle differences in base station receiver hardware, such as receiver circuitry noise sensitivity, that the UE can not take into consideration when performing network selection. In such cases, a stationary MTC device might consistently perform random access to an inappropriate network, or it may use inappropriate parameters when performing random access. If many MTC UEs behave in this fashion, then overall system performance will suffer.

Consider a case where a UE can use two different networks (e.g., a legacy LTE network as well as a separate network for enhanced MTC coverage). In that case, a network selection needs to be performed. But if the UE selects the wrong network, the overall system efficiency deteriorates, thereby making it more difficult for other UEs to access the network. And forcing the UE to perform a handover to the appropriate network creates undesired signaling and operations.

Even if the UE receives only one set of signals designed for enhanced MTC coverage, it might still be difficult for the UE to perform a proper network selection. Consider for example a heterogeneous network scenario where small indoor nodes are put into sleep mode during low traffic conditions. Here, the only signal reaching the UE may be the new signals designed for enhanced MTC coverage. But small indoor nodes may still be actively receiving in the uplink, in which case, a particular UE should not fall back to using the network defined for enhanced MTC coverage but should instead use the normal legacy network. But the UE is not aware of this because it can not detect the presence of the nearby sleeping low power indoor node.

The number of MTC device UEs is expected to be much larger than the number of non-MTC device UEs. If a very large number of such devices consistently perform network access selecting a less optimal network, then the system performance can be severely degraded. The UE should select the network with the best uplink performance, and to do so, it needs sufficient the information to make that selection. Another issue that relates to selecting the best network is load balancing between networks. If many MTCs decide on their own which network to use for communication, then the networks will have difficulty performing effective load-balancing amongst the networks.

SUMMARY

An aspect of the embodiments relates to a radio network node and method for communicating with user equipments, UEs, over a radio interface. The node estimates one or more quality factors, associated with each of a first and second network, that depend on a load, an expected UE behavior, or an uplink channel quality for one or both of first and second networks. The node then determines one or more network selection parameters based on the estimated one or more quality factors and communicates the one or more network selection parameters to at least one UE for enabling the UE to select one of the first and second networks for subsequent access by the at least one UE.

Example embodiments further include the node transmitting to the at least one UE, default network access signals for one or more first and second networks, that permit the at least one UE to make an initial access to one of the first and second networks.

The communicating includes for example a broadcast transmission or a dedicated transmission. The one or more network selection parameters may include one or more of: a setting, a rule, an initial power target value, a power increase value per access attempt, a back-off time, a persistence parameter, an offset, or a threshold.

In example embodiments, the one or more network selection parameters is valid for a limited time or within a limited area.

Examples of the radio network node include a base station or a controller node.

Another aspect of the embodiments relates to a UE method and a UE that communicates over a radio interface with a radio network node. The UE receives from the radio node one or more network selection parameters based on one or more quality factors that depend on a load, an expected UE behavior, or an uplink channel quality associated with one or both of first and second networks. The UE then uses the one or more network selection parameters to select one of first and second radio networks and accesses the selected radio network.

Example embodiments include the UE initially accessing the one of the first and second networks prior to receiving from the radio node one or more network selection parameters.

An aspect of the embodiments relates to a system in which at least one UE communicates over a radio interface and selects one of first and second radio networks. The system includes:

means e.g. a radio network node configured for estimating one or more quality factors that depend on a load, an expected UE behavior, or an uplink channel quality for one or both of first and second networks. The means e.g. the radio network node is further configured for determining one or more network selection parameters based on the estimated one or more quality factors; and also configured for communicating the one or more network selection parameters to at least one the UEs for the one UE to select one of the first and second networks for subsequent access by the one UE.

In one example embodiment, the first network and the second network are different radio networks that use different base stations. In another example embodiment, the first network is a first mode of operation of a common radio network and the second network is a second different mode of operation of the common radio network. In another example embodiment, each of the first and second networks includes a respective system or a respective mode of operation having a corresponding time and frequency synchronization.

In another example embodiment, the first and second networks are different networks that share one or more of a same base station, a same radio access technology, a same radio frequency bandwidth, or a same signaling format.

In another example embodiment, the means (or radio network node) for estimating is configured to estimate the one or more of the quality factors based on the load of one or both of the first and second networks or based on the expected UE behavior; or based on the uplink quality of one or both of the first and second networks.

In another example embodiment, the first network is a legacy network and the second network is a deep coverage network for Machine Type Communications (MTC) traffic.

DETAILED DESCRIPTION

Figure 1:
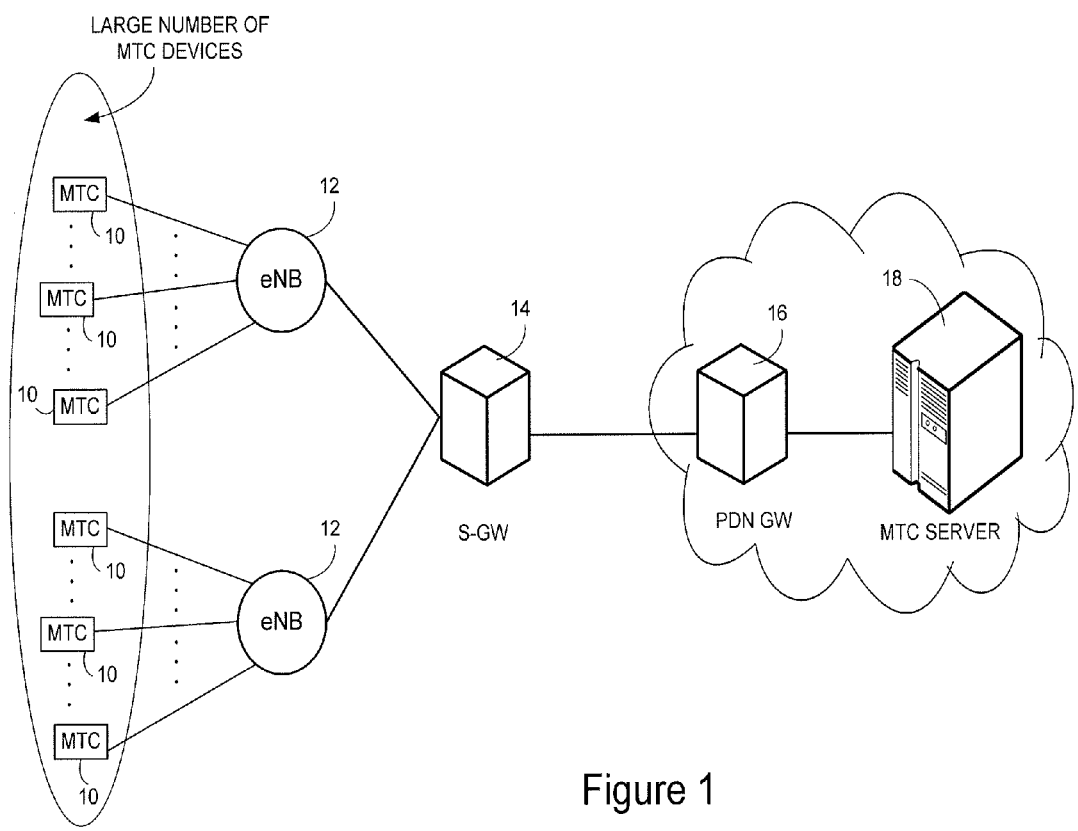
FIG. 1 illustrates a communication system that provides communication between a number of MTC devices and an MTC server.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

It should be understood by the skilled in the art that "UE" is a non-limiting term comprising any wireless device or node equipped with a radio interface allowing at least: transmitting signals in UL and receiving and/or measuring signals in DL. A UE herein may comprise a UE (in its general sense) capable of operating or at least performing measurements in one or more frequencies, carrier frequencies, component carriers or frequency bands. It may be a "UE" operating in single- or multi-RAT or multi-standard mode. As mentioned above, MTC devices are examples of one of many types of UEs.

A cell is associated with a base station, where a base station comprises in a general sense any node transmitting radio signals in the downlink (DL) and/or receiving radio signals in the uplink (UL). Some example base stations are eNodeB, eNB, Node B, macro/micro/pico radio base station, home eNodeB (also known as femto base station), relay, repeater, sensor, transmitting-only radio nodes or receiving-only radio nodes. A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

The signaling described is either via direct links or logical links (e.g. via higher layer protocols and/or via one or more network nodes). For example, signaling from a coordinating node may pass another network node, e.g., a radio node.

The example embodiments are described in the non-limiting example context of an Evolved UMTS Terrestrial Radio Access Network (E-UTRAN) LTE type system. However, the technology is not limited thereto, and may apply to any Radio Access Network (RAN), single-RAT or multi-RAT.

Figure 2:
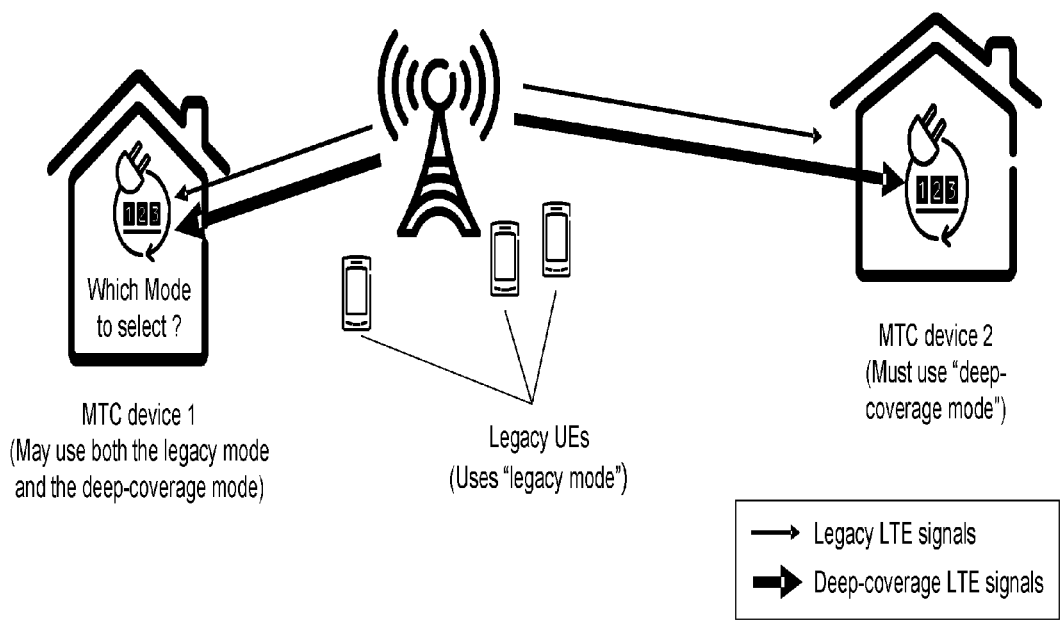
FIGS. 2-4 illustrate several example scenarios in which an MTC may need to select between two or more different networks.
Figure 3:
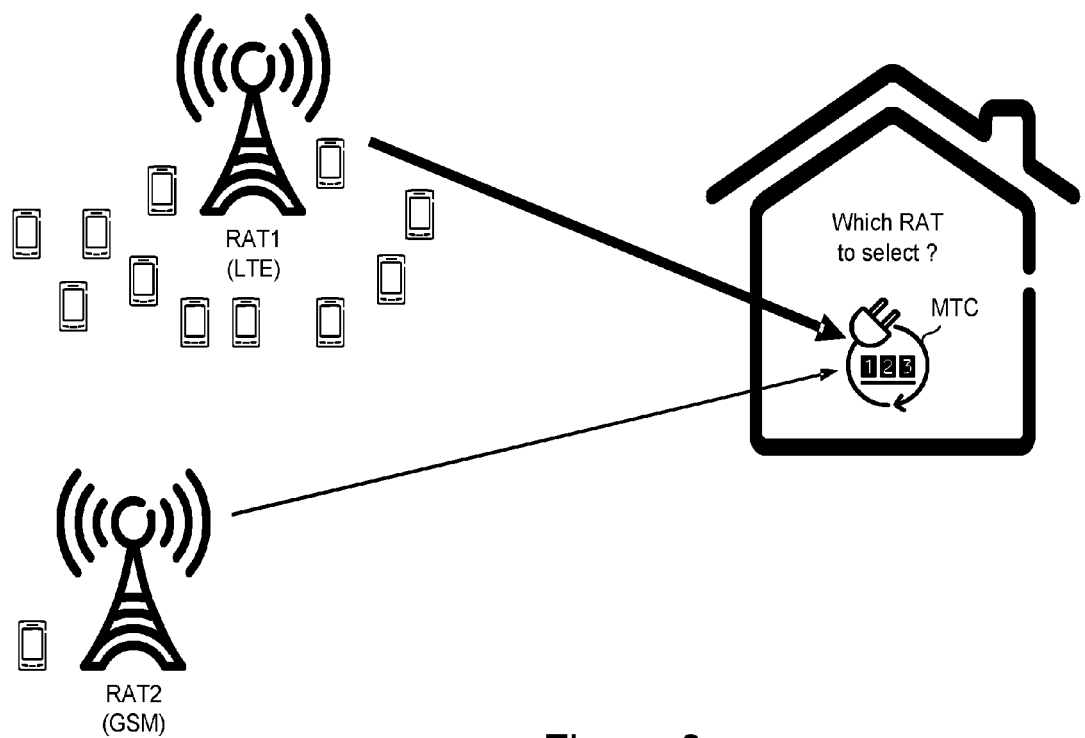
Figure 4:
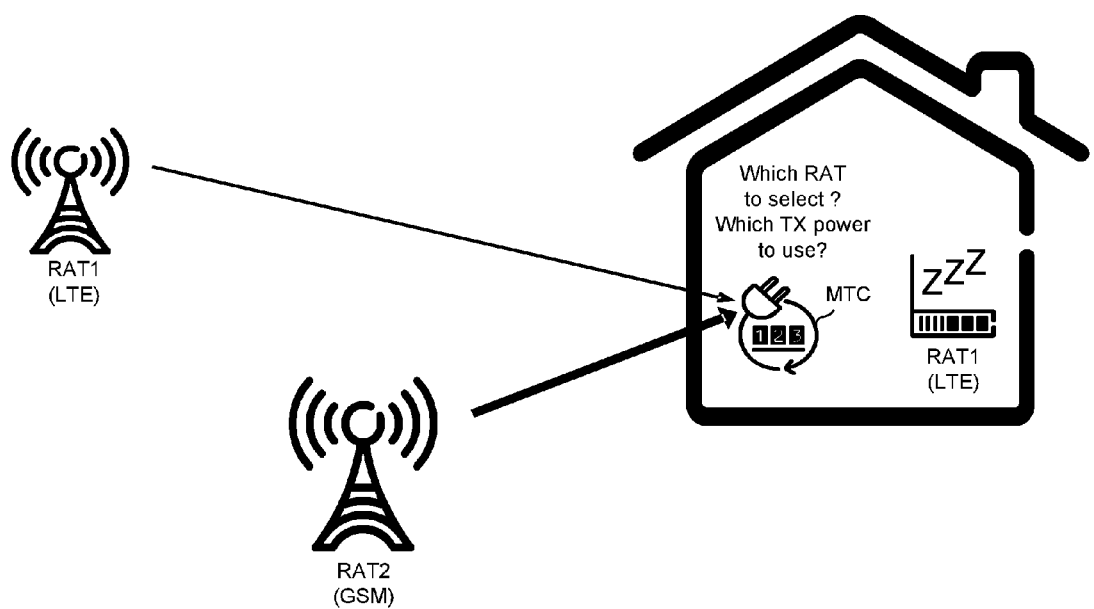

As described in the background, a study item on low cost MTC in 3GPP RAN1 [3GPP Tdoc RP-121441] aims to improve coverage by approximately 20 dB for low rate MTC devices. FIGS. 2-4 illustrate several example scenarios in which an MTC may need to select between two or more different networks (the term network is used broadly as defined above). FIG. 2 shows legacy UEs near a single base station along with two representative MTC devices 1 and 2 in separate buildings. The MTC device 1 may use a legacy mode or network and a deep coverage mode or network while the MTC device 2 can only a deep coverage mode or network. The issue is how to ensure that MTC device 1 selects the appropriate mode or network. If the MTC device 1 selects the "legacy mode" associated with a network 1, then it will compete for radio resources with the other UEs in the system using the legacy mode. During a peak traffic hour that might not be the desired behavior for this UE. On the other-hand, if the MTC device 1 selects the "deep-coverage mode" associated with a network 2, then it will compete for resources with other devices that have no other option but to use the "deep-coverage mode." This competition might be problematic for some power-limited UEs, like the MTC device 2 in this example that cannot reach the base station with the same received power as the MTC device 1 can.

The same issue exists for the MTC device in FIG. 3, but now there are two different base stations that use different RATs, e.g., LTE and Global System for Mobile Communications (GSM). In FIG. 3, since the load in the LTE network is high at the moment, the MTC device should select the GSM network, even though the received reference signal power from the LTE network is higher as indicated with the thicker bold line representing the downlink signal from the LTE eNB.

FIG. 4 presents yet another network selection situation where an MTC device is in the same building as a low power, LTE base station 12c that is currently in sleep mode (zzz) so that the MTC device is not receiving any transmission from it, but is receiving transmission from both the networks including an LTE eNB (RAT1) base station 12a and a GSM (RAT2) base station 12b. The sleeping low-power base station node 12c is part of the LTE network. The UE should select the LTE network even though a corresponding Reference Signal Received Power (RSRP) measurement by the MTC device from the farther away LTE eNB 12a might indicate a poor channel quality. Because the low-power base station node 12c is close by to receive the signals from the UE, the channel quality of the LTE network via base station 12c is actually very good.

In 3GPP MTC coverage enhancement, one goal is to improve the link budget by approximately 20 dB. To achieve such large coverage enhancements, multiple physical channels and physical signals will need to be improved. Since the required improvements are so large (20 dB is equivalent to 100 times higher signal-to-noise ratio), it is likely that repetition may provide a significant part of the required coverage improvements. But current LTE signals can not easily just be repeated approximately 100 times. So new signals need to be defined for this purpose. Therefore, non-limiting, example embodiments below assume a new set of signals and physical channels defined on top of existing legacy (LTE in this example) signals and physical channels. The new set of signals may, for example, be defined inside the data region of the legacy carrier (i.e., resources that are normally used for scheduled Physical Downlink Shared Channel (PDSCH) data transmissions) or inside Multicast-Broadcast Single Frequency Network (MB-SFN) sub-frames.

Figure 5:
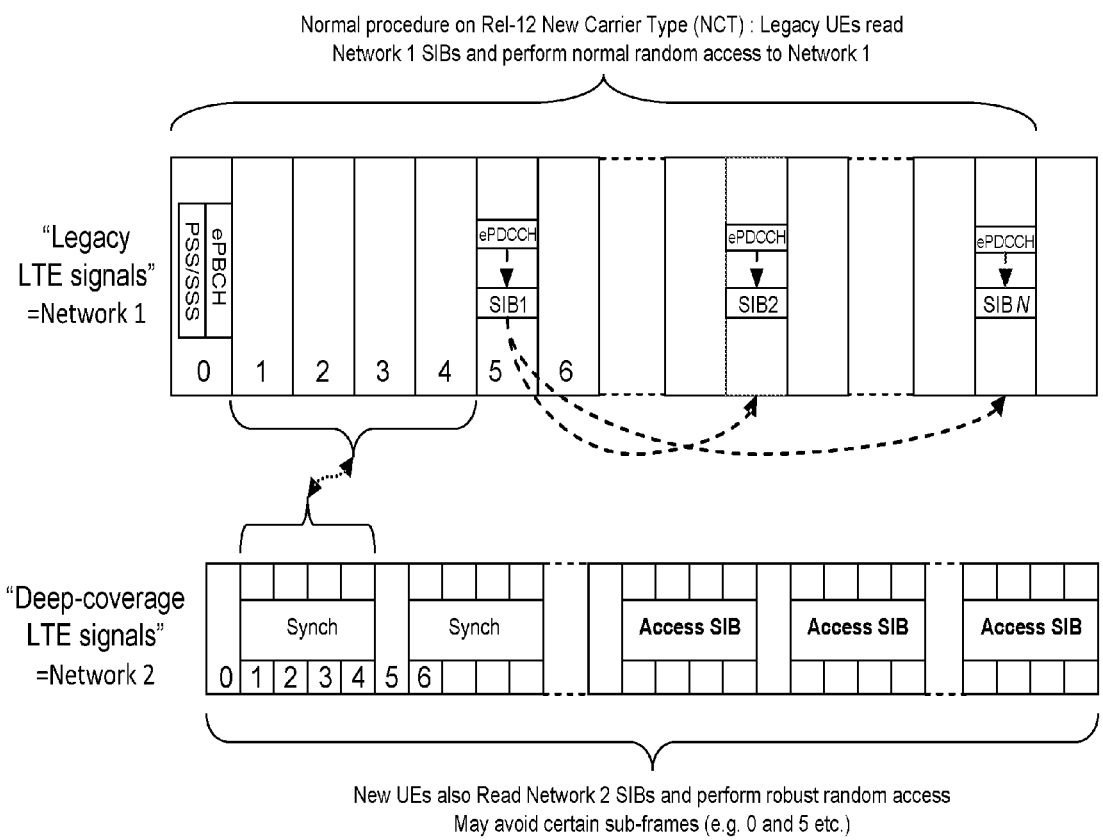
FIG. 5 illustrates an example signaling format for normal legacy LTE signals referred to as network 1 access signals overlaid with deep coverage LTE signals referred to as network 2 access signals.

FIG. 5 illustrates an example signaling format for normal legacy LTE signals referred to as network 1 access signals overlaid with deep coverage LTE signals referred to as network 2 access signals. The top part of the figures shows a typical or normal procedure for a LTE Rel-12 New Carrier Type (NCT) where legacy UEs read Network 1 system information blocks (SIBs) and perform normal random access to Network 1. The bottom part of the figure shows a procedure for LTE Rel-12 UEs that can also Read Network 2 SIBs and perform robust random access where certain sub-frames (e.g., 0 and 5 etc.) are avoided.

In this example of FIG. 5, legacy services and deep coverage MTC services can co-exist on the same carrier thereby avoiding assigning a separate set of radio resources (e.g., a frequency band) for the deep coverage MTC terminals which could be very costly. Deep-coverage MTC UEs can typically consume a large amount of radio resources while generating very low income per device. But since network 1 resources at given points in time often are not used or are wasted, the cost of assigning these resources to deep coverage MTCs in a time-share with legacy services is relatively low. Legacy LTE UEs receive existing legacy signaling, like Extended Synchronization Signal (ESS)/Primary Synchronization Signal (PSS)/Secondary Synchronization Signal (SSS) and System Information Block (SIB) messages, over existing channels, like enhanced Physical Broadcast Channel ePBCH (or PBCH) and enhanced Physical Downlink Control Channel (ePDCCH) (or PDCCH), respectively. The existing legacy signaling, which corresponds to network 1, occurs in this example during time slots 0 and 5. However, the deep-coverage LTE signals (network 2) are sent during the other time slots, like 1-4 and 6-9, to transmit network 2 signals including Sync signals on one or more sync channels and access SIB signals.

The example in FIG. 5 is a non-limiting example showing that it is possible for one deep-coverage network (as defined above) to share radio resources used by another (legacy) network. Although the example shows one possible way to signal synchronization and to access information that defines the two networks, additional signals, e.g., for downlink and uplink communication of data and control plane communication, may be included (examples are not shown in the figure so as not to obscure the figure with excessive detail).

The technology in this application includes methods and apparatus that provide network control of UE access network selection. The term "network" as used herein includes a system or a mode of operation that defines its own time and frequency synchronization and transmits signals via one or more base stations including information for UEs to achieve that time and frequency synchronization as well as enough system information to allow a UE to make a random access using defined uplink radio resources. Only a limited part of the total system information, here denoted "access information," that the UE needs prior making an access attempt to the network is considered. This access information may be explicitly signaled as part of the system information. For example, in LTE, the access information may be contained in the master information block (MIB) and in the system information blocks 1 and 2 (SIB1 and SIB2). The access information may also be implicitly signaled using a particular transmitted system signature sequence that the UE can detect and map to a known table of possible access information content. The access information as defined here may also be referred to as "partial system information" or "SIB-lite."

Two different networks may share the same base station, the same radio access technology (RAT), the same bandwidth, the same signaling format, and/or be coordinated in time and frequency. But the two networks may also use different base stations, different types of base stations, different RATs, signaling formats, etc. Non-limiting examples used below in the detailed description include a first network that uses a legacy set of LTE signals and a second network that uses a new set of signals designed for UEs with a lower link budget as compared to legacy UEs. This example new second network is called a deep coverage network in the examples below. Of course, the technology is not limited to LTE or to the illustrative examples.

In one non-limiting example embodiment, a radio base station transmits default network access signals for one or more first and second networks that permit a UE to make an initial access to one of the first and second networks. The base station or some other node estimates one or more quality properties of at least a first access network and a second access network. The one or more quality properties may be determined, for example, based on the load of the networks, an expected UE behavior, and/or an uplink quality of the networks. Examples of UE behavior to consider in this context are a-priori knowledge of traffic and mobility characteristics of a particular UE. The base station or some other node determines one or more access parameters for network-controlled access network selection based the estimated quality properties. The base station communicates, e.g., by broadcast or dedicated transmission, the one or more access parameters to a UE station for use in selecting an appropriate one of multiple networks for access. In an example embodiment, an access parameter is implemented using an offset value.

In another non-limiting example embodiment, a UE initially accesses a first network out of multiple, potentially-available networks. The UE receives one or more access parameters for network selection from one or more of the networks and uses the access parameters to select one of multiple networks for subsequent access. Although one advantageous application is for MTC type UEs, the technology may be applied to any type of UE.

As will be explained in conjunction with the flowcharts in FIGS. 6 and 7, a UE is provided with information to be used when selecting a network and performing random access. The information can be either (1) broadcasted to the UE in a broadcast message, or (2) communicated to the UE in a dedicated message. If a UE can make a first network access without this information, then it may later receive a message, e.g., dedicated or broadcasted, conveying information about how to perform subsequent network accesses. The first random access performed by the UE can use default parameters valid for all UEs in the cell, (which may be inappropriate and not optimal for MTC UEs for example), but thereafter, the network may determine and assign new network access parameters to be used in one or more subsequent network accesses by the UE.

Figure 6:
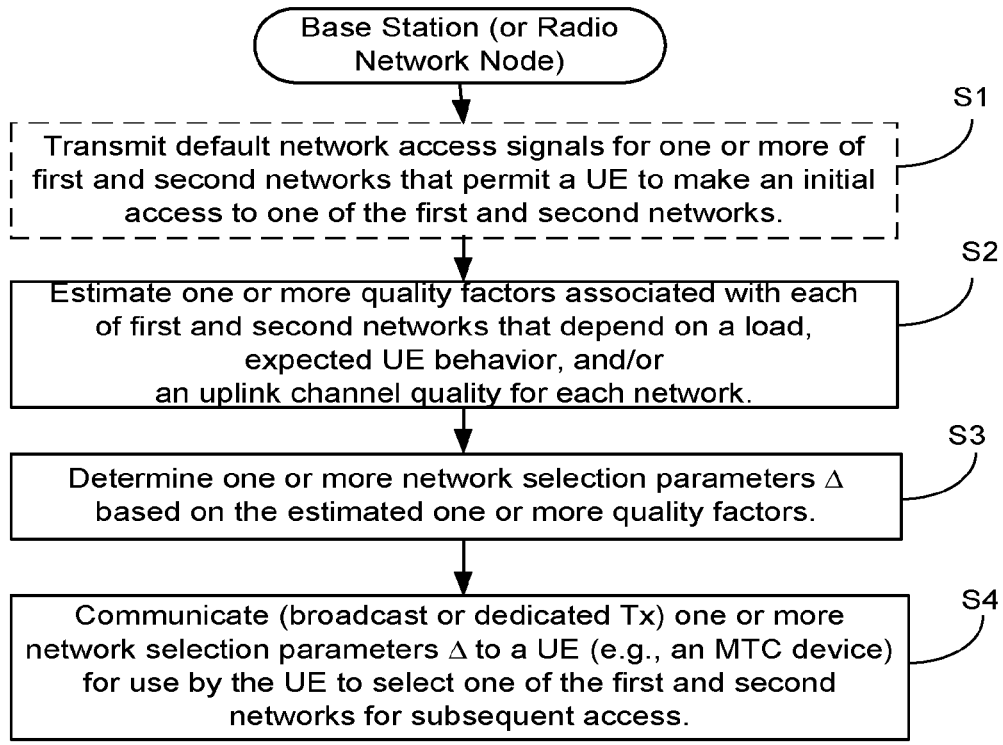
FIG. 6 is a flowchart diagram illustrating non-limiting example procedures performed by a base station.
Figure 7:
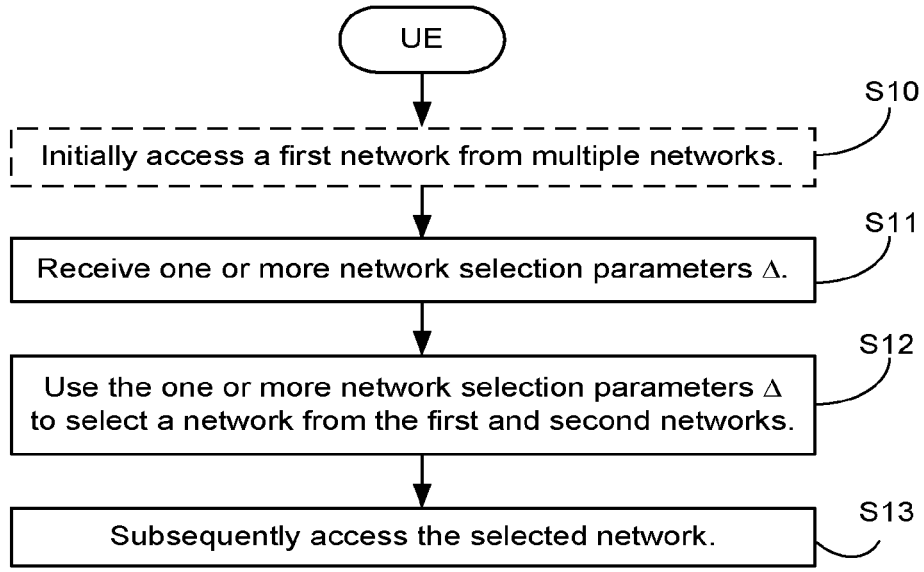
FIG. 7 is a flowchart diagram illustrating non-limiting example procedures performed by a UE.

FIG. 6 is a flowchart diagram illustrating non-limiting example procedures performed by a radio network node such as a base station or a radio network node. The base station or radio network node transmits default network access signals for one or more of first and second networks that permit a UE to make an initial access to one of the first and second networks (step S1). The base station or radio network node estimates one or more quality factors associated with each of first and second networks that depend on a load, an expected UE behavior, and/or an uplink channel quality for one or both networks (step S2). One or more network selection parameters A are determined based on the estimated one or more quality factors (step S3). Step S2 and/or step S3 need not be performed in the base station or radio network node and may be performed instead in an intermediate node, e.g., in a controller node of some kind. The one or more network selection parameters A are communicated to a UE (e.g., an MTC device) for use by the UE to select one of the first and second networks for subsequent access (step S4). The communication may be for example via broadcast or dedicated transmission.

The parameter(s) may include settings and/or rules for selecting which network and/or cell to access (in case the UE receives several networks and/or cells) and optionally other values such as for selecting an appropriate power for each network access attempt (e.g., initial power target, power increase value per attempt) as well as other random access related parameters dedicated for this particular UE (e.g., back-off time, persistence parameters etc). The base station or radio network node may also transmit information that may be used for selecting between a cell served by the base station and a cell served by another base station, or another cell served by the base station that belongs to another radio access technology.

A UE capable of communicating in two different modes or networks, e.g., in both a legacy network mode and a non-legacy network mode for enhanced coverage, receives a first set of signals (e.g., legacy signals for synchronization and data communication) as well as a second set of signals from the base station or radio network node (e.g., non-legacy signals for synchronization and data communication) and may select a network for communication based on a rule controlled by the network or base station or radio network node. FIG. 7 is a flowchart diagram illustrating non-limiting example procedures performed by a UE. Initially, the UE accesses a first network from multiple potentially available networks (step S10). The UE receives, from a base station or radio network node, one or more network selection parameters (step S11) and uses the one or more network selection parameters to select a network from the first and second networks (step S12). The UE subsequently accesses the selected network (step S13). The initial network access using default network selection parameters is optional in some embodiments. In situations where the network selection parameters are broadcasted from one of the networks, e.g., network 2, then the UE does not need to first make an initial access to one of the networks to attain the network selection parameters. Instead, the parameters used to select between network 1 and network 2 are received as part of the system information transmitted from network 2.

As mentioned above, the different networks may be coordinated closely in time and frequency, may use the same spectrum, and may use the same physical antennas. But both networks independently define their own time and frequency synchronization and provide enough system information to allow a UE to make a random access by using defined uplink radio resources. One way to represent such a network is using sets of signals and associated procedures.

The rule for network selection may contain a threshold value that is provided by the network or base station or radio network node to the UE for example. For example, only when the received signal quality of the first set of signals is below a threshold may the communication procedure associated with the second set of signals be used. Alternatively, the first network is used unless the received signals from the second network are A dB better than the received signals from the first network. The value of the threshold may be sent in a dedicated transmission to the UE and stored there in order to be used when the next message transfer occurs. The value of the threshold may also be broadcasted in the coverage area of the cell.

Consider this example where the new network includes at least one parameter used as a threshold value or an offset value to guide UEs that receive signals from both networks as to which network to select an access network. Initially, the UE can measure the received signal quality of the first network (or legacy set of signals), received signal reference power RSRP1, and the second network (or new set of signals), RSRP2. Assume that the UE has searched for different cells belonging to the different networks and that RSRP1 and RSRP2 corresponds to the best or good enough cells belonging to the first and second networks, respectively. Initially, a UE may have a rule for selecting which network to attach to that may be defined according to this non-limiting example:

if (RSRP1>RSRPmin1) and (RSRP2>RSRPmin2) then
  select first network
end where RSRPmin1 and RSRPmin2 are the minimum required received reference signal power level for the first network and second network, respectively. The if-statement above only enables UEs to choose between networks without any additional information received from either of the two networks. This is only one simplified and non-limiting example of how a UE may select between two possible network candidates. The parameters RSRPmin1 and RSRPmin2 may be defined in a standard or coded into the UE and are typically not required to communicate via system broadcast. The minimum signal level a UE needs for communicating with a network is typically implementation-dependent and is affected by factors like receiver noise factor, antenna sensitivity, etc.

Continuing with this example, the two parameters may, in the case where network 1 corresponds to a legacy LTE set of signals and network 2 corresponds to a set of signals for enhanced MTC coverage, be related as follows: RSRPmin2=RSRPmin1+20 [dB]. The objective is to control one or more network selections using information transmitted from at least one of the networks, i.e., using an access parameter for network selection which is expressed in this example as an offset value ($\Delta$). If the system information communicated via, e.g., the second network contains this offset parameter ($\Delta$), then a network selection rule may be programmed in the UE that contains an if-clause like this:

if (RSRP1 > RSRPmin1) and (RSRP2 > RSRPmin2) then
  if (RSRP1 > $\Delta$) then select first network
  else select second network
end Thus, UEs that may use both networks intelligently select between at least the first and second networks (the selection may be between more than two networks) under network control via the parameter $\Delta$. The number of UEs selecting the first network for access is under network control via the parameter Δ that is communicated to the UE via the second network in this example.

Such rules may be valid for a limited time and/or within a limited area. For example, a UE may have a motion detector (e.g., a device that detects vibration, a device that compares the radio signal fingerprint to a previously stored value, an accelerometer, a Global Positioning System (GPS) receiver, a Doppler measurement unit or similar) used to determine if an old set of access rules are still valid. The access rules may be valid for a limited time duration each day, e.g., only during peak traffic hours.

Figure 8:
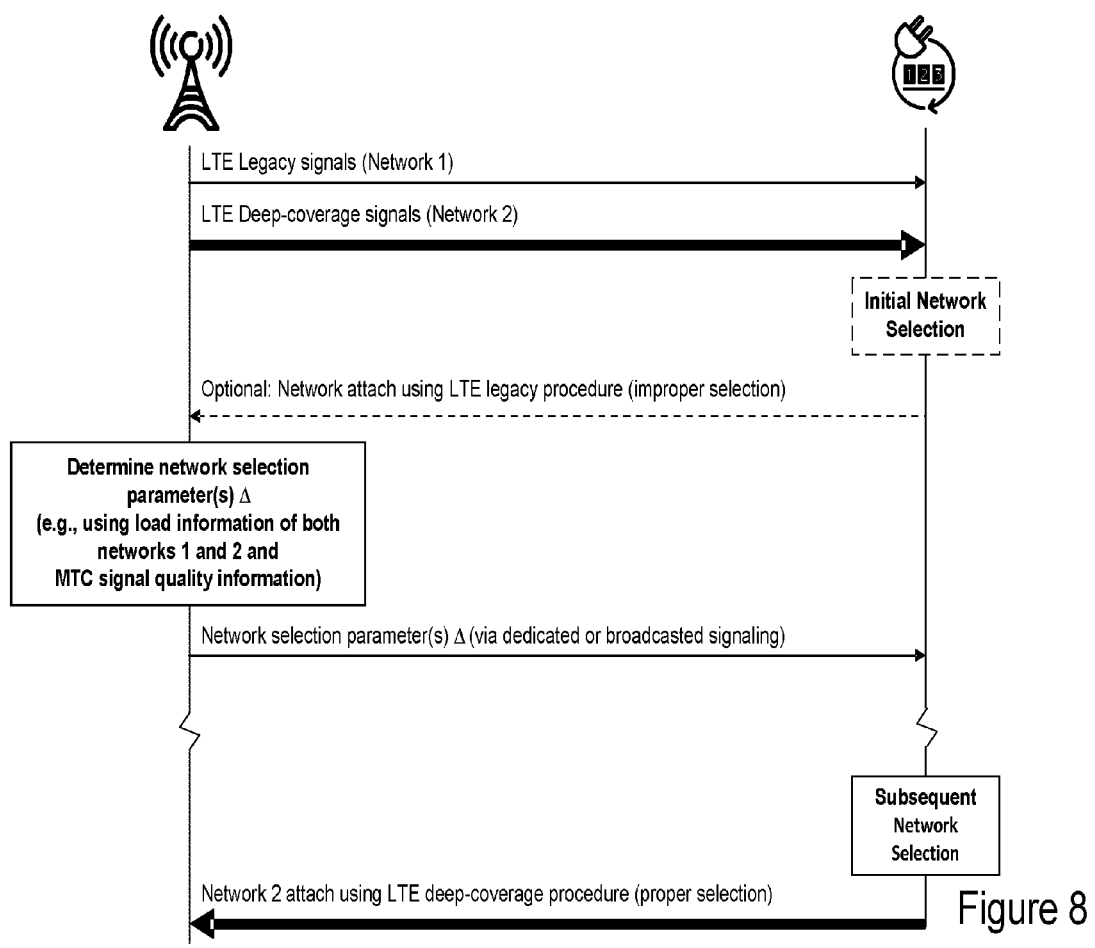
FIG. 8 is a diagram illustrating one non-limiting example network access selection signaling procedure.

FIG. 8 is a diagram illustrating one non-limiting example network access selection signaling procedure. The diagram shown in FIG. 8 may be viewed as an embodiment of the present invention that solves the problem identified in FIG. 2. Here a single LTE base station (an eNB) transmits both LTE legacy signals corresponding to legacy network 1 signals and LTE deep coverage signals corresponding to deep coverage network 2 signals. The MTC device may optionally make an initial network selection of the LTE legacy network 1 and performs a legacy network attach procedure to the LTE legacy network 1. The base station determines one or more network selection parameters A using for example load information associated with both networks 1 and 2 and/or MTC detected signal quality information. The base station sends the one or more network selection parameters A to the MTC device via dedicated or broadcasted signaling, and the MTC device makes a subsequent network selection using the one or more network selection parameters A. In this example, network 2 is the appropriate network for this MTC device.

Figure 9:
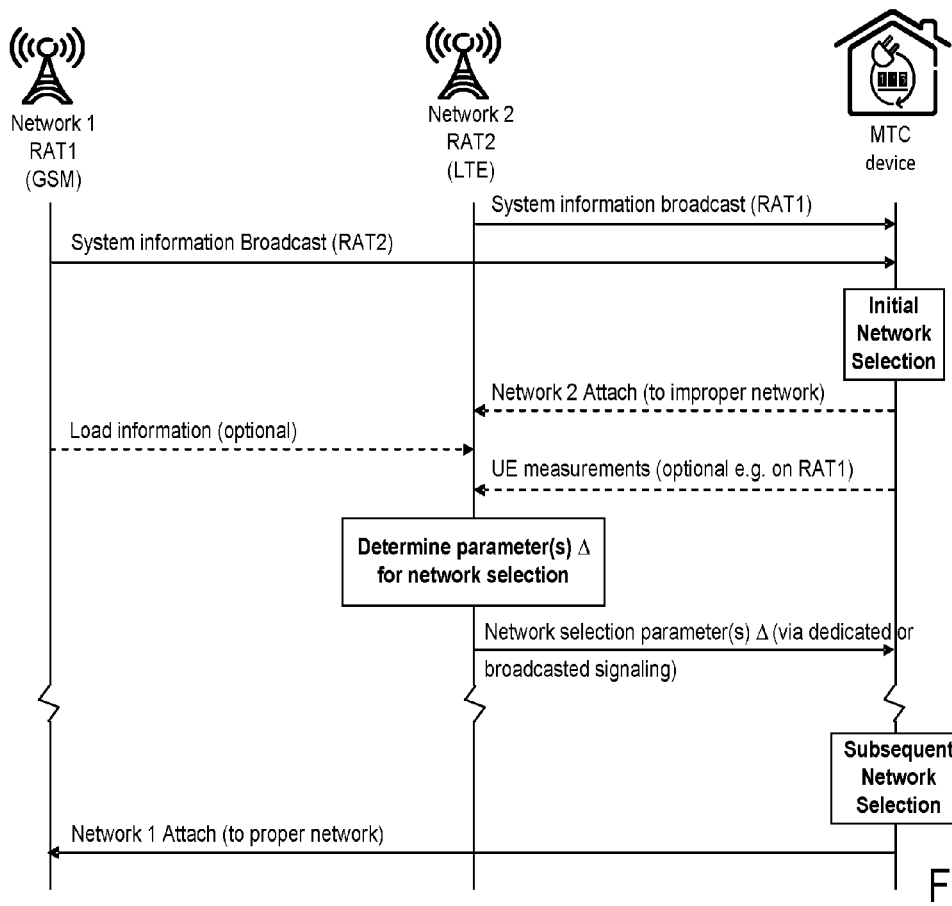
FIG. 9 is a diagram illustrating one non-limiting example network access selection signaling procedure.

FIG. 9 is a diagram illustrating one non-limiting example network access selection signaling procedure. This is an example where two networks (network 1 and network 2) belong to different radio access technologies and are transmitted from different base stations or radio network nodes. In the FIG. 8 example, the signals from the two networks are transmitted from the same base station or radio network node using different modes of the same radio access technology. The example in FIG. 9 may be used, for example, to solve the problems identified in FIG. 3 and FIG. 4. In FIG. 3, since the load in the LTE network is currently high, the MTC device should preferably select the GSM network, even though the received reference signal power from the LTE network is higher. In FIG. 4, since there is a nearby LTE base station that the MTC device is not aware of, the MTC device should select the LTE network even though the reference signal measurements indicate that the GSM network might be a better choice. In FIG. 9, there are two base stations including a network 1 GSM base station, which transmits network 1 signals, and a network 2 LTE base station which transmits LTE network 2 signals. The MTC device may optionally make an initial or default network selection of the LTE network 2 and perform a network 2 attach procedure to the LTE network 2. The LTE base station determines one or more network selection parameters A using for example load information associated with both networks 1 and 2 and/or MTC measurements. The LTE base station sends the one or more network selection parameters Δ via system information block (SIB) to the MTC device using RAT signaling, and the MTC device makes a subsequent network selection using the one or more network selection parameters Δ. In this example, network 1 is the appropriate network for this MTC device.

Figure 10:
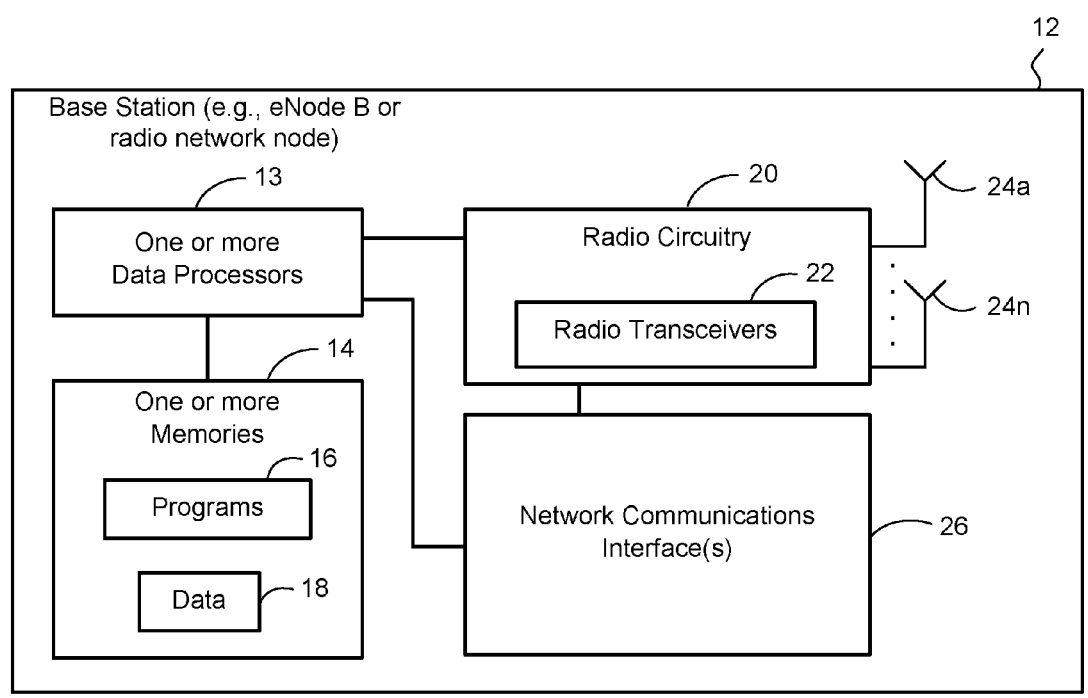
FIG. 10 is a function block diagram illustrating a non-limiting example base station.

A function block diagram in FIG. 10 shows a base station or radio network node, e.g., an eNB, that may be used in example embodiments described above. The base station 12 or radio network node comprises one or more data processors 13 that control the operation of the base station or radio network node. The one or more data processors 13 are connected to radio circuitry 20 or communications circuitry that includes multiple radio transceivers 22 with associated antenna(s) 24a . . . 24n which are used to transmit signals to, and receive signals from, other radio nodes such as user equipments (UEs). The base station or radio network node also comprises one or more memories 14 connected to the one or more data processors 12 and that store program 16 and other information and data 18 required for the operation of the base station or radio network node and to implement the functions described above. The base station or radio network node also includes components and/or circuitry 26 e.g. network communications interface(s) for allowing the base station to exchange information with other base stations and/or other radio network nodes.

Thus in accordance with previously described embodiments, the base station 12 or radio network node is configured to communication with UEs over a radio interface. The radio network node 12 comprising one or more data processors 13 configured to estimate one or more quality factors, associated with each of a first and second network, that depend on a load, an expected UE behavior, or an uplink channel quality for each of said first and second networks, and the one or more processors 13 further configured to determine one or more network selection parameters based on the estimated one or more quality factors. The communications or radio circuitry 20 coupled to the one or more data processors, configured to communicate/send the one or more network selection parameters to at least one the UEs for the one UE to select one of the first and second networks for subsequent access by the one UE. Hence, a UE e.g. a MTC in accordance with the exemplary embodiments herein may be configured to select from multiple radio networks e.g. from first and second networks or be configured to select between two different network mods belonging to the same radio access network.

Additional functions performed by the radio network node or base station 12 have already been described and include: the communications or radio circuitry 20 configured to transmit to the at least one UE defaults network access signals for one or more of first and second networks that permit the at least one UE to make initial access to one of the first or second networks. The one or more network selection parameters includes e.g. a setting, a rule, an initial power target value, a power increase value per access attempt, a back-off time, a persistence parameter, an offset or a threshold, as previously described. Also, the one or more parameters is valid for a limited time or within a limited area.

Figure 11:
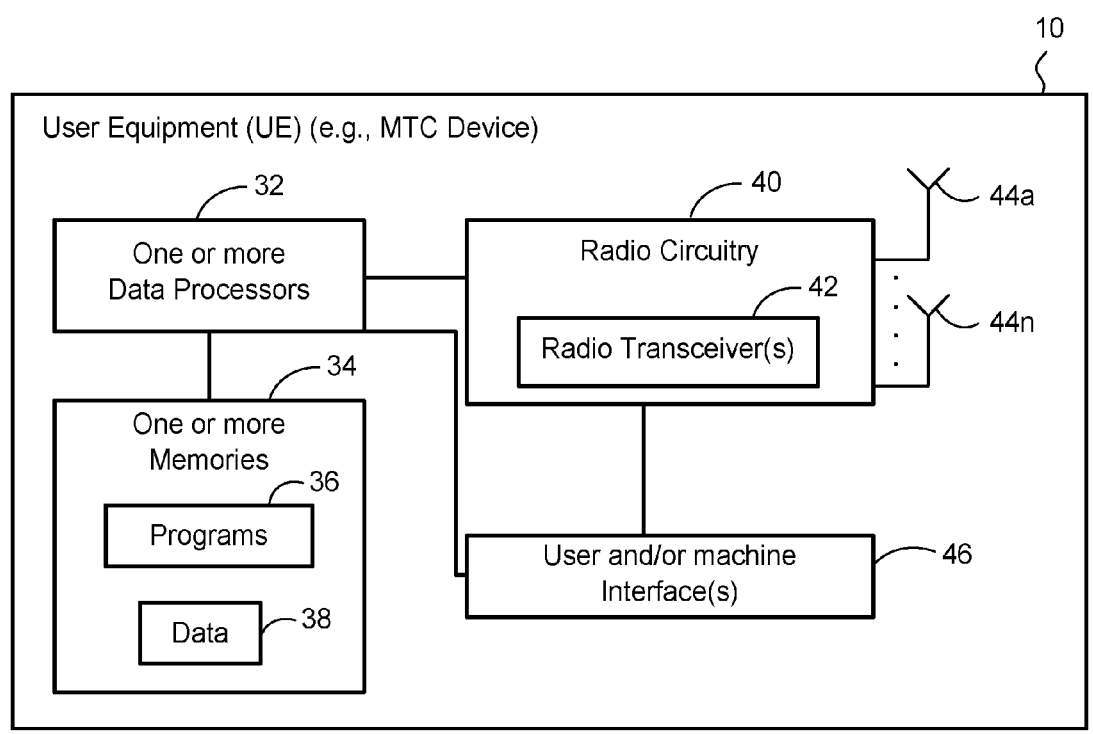
FIG. 11 is a function block diagram illustrating a non-limiting example UE.

A function block diagram in FIG. 11 shows a UE 10 that can be used in example embodiments described above. The UE 10 comprises one or more data processors 32 that control the operation of the UE. The one or more data processors 32 are connected to multiple radio transceivers 42 and radio circuitry 40, that may be selectively coupled with one or more antenna(s) 44a . . . 44n which are used to transmit signals to, and receive signals from, other radio network nodes such as base stations. The UE 10 also comprises one or more memories 34 connected to the one or more data processors 32 and that store program 36 and other information and data 38 required for the operation of the UE and to implement the UE functions described above. The UE also includes one or more user and/or machine interfaces 46 is further provided to for retrieving, receiving, storing, and inputting information. The UE also includes radio circuitry 40

Thus, in accordance with previously described embodiments, the UE 10 is configured to communicate over a radio interface with a radio network node e.g. the base station 12 of FIG. 10, the radio circuitry 40 configured to receive from the radio network node one or more network selection parameters based on one or more quality factors that depend on a load, an expected UE behavior, or an uplink channel quality associated with one or both of first and second networks, and the one or more data processors (32), coupled to the radio circuitry 40, configured to use the one or more network selection parameters to select one of the first and second radio networks and to access the selected radio network. The one or more data processors 32 is also configured to initially access the one of the first and second networks prior to receiving the one or more network selection parameters.

The embodiments herein, as previously described, also relate to a system in which at least one UE communicates over a radio interface with at least one radio network nod, UE configured to select one of first and second radio networks. In the system, the radio network node is configured to estimate one or more quality factors that depend on a load, an expected UE behavior, or an uplink channel quality for one or both of first and second networks. The radio network node is also configured to determine one or more network selection parameters based on the estimated one or more quality factors; and is configured to communicate the one or more network selection parameters to at least one the UEs for the UE to select one of the first and second networks for subsequent access by the one UE.

The technology includes many advantages. For example, the UE does not block other UEs from network access, and system efficiency is not degraded by a very large number of UEs selecting a non-optimum networks for communication. In case radio resources are shared between the two networks (as in the case with a legacy LTE network and a deep-coverage LTE network using the same radio spectrum), the technology described allows for load balancing between the networks that can react to load fluctuation much faster than the time required to perform a radio resource re-configuration between the networks.

Although the description above contains many specifics, they should not be construed as limiting but as merely providing illustrations of some presently preferred embodiments. Embodiments described herein may be considered as independent embodiments or may be considered in any combination with each other to describe non-limiting examples. Although non-limiting, example embodiments of the technology were described in an LTE context, the principles of the technology described may also be applied to other radio access technologies. Indeed, the technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

The invention claimed is:

1. A method implemented in a radio network node configured to communicate with user equipments, UEs, over a radio interface, the method comprising:
   transmitting, to at least one UE, default network access signals for one or more first and second networks, that permit the at least one UE to make an initial access to one of the first and second networks;
   estimating one or more quality factors, associated with each of the first and second network, that depend on an uplink channel quality for one or both of the first and second networks;
   determining one or more network selection parameters based on the estimated one or more quality factors, the one or more network selection parameters comprising a threshold or an offset; and
   communicating the one or more network selection parameters comprising the threshold or offset to the at least one UE for enabling the UE to select one of the first and second networks for subsequent access by the at least one UE.

2. The method in claim 1, wherein the communicating includes a broadcast transmission or a dedicated transmission.

3. The method in claim 1, wherein the one or more network selection parameters further comprise one or more of: a setting, a rule, an initial power target value, a power increase value per access attempt, a back-off time, or a persistence parameter.

4. The method in claim 1, wherein the one or more network selection parameters is valid for a limited time or within a limited area.

5. A radio network node configured to communicate with user equipments, UEs, over a radio interface, the radio network node comprising:
   one or more data processors configured to:
      estimate one or more quality factors, associated with each of a first and second networks, that depend on an uplink channel quality for each of the first and second networks, and
      determine one or more network selection parameters based on the estimated one or more quality factors, the one or more network selection parameters comprising a threshold or an offset; and
   communications circuitry, coupled to the one or more data processors, configured to:
      transmit default network access signals for at least one of the first and second networks that permit at least one UE to make an initial access to one of the first and second networks;
      communicate the one or more network selection parameters comprising the threshold or offset to the at least one UE for the at least one UE to select one of the first and second networks for subsequent access by the one at least UE.

6. The radio network node in claim 5, wherein the one or more network selection parameters further comprise one or more of: a setting, a rule, an initial power target value, a power increase value per access attempt, a back-off time, or a persistence parameter.

7. The radio network node in claim 5, wherein the one or more network selection parameters is valid for a limited time or within a limited area.

8. The radio network node in claim 5, wherein the radio network node is a base station or a controller node.

9. A method implemented in a user equipment, UE, configured to communicate over a radio interface with a radio network node, the method comprising:
   receiving from the radio network node default network access signals for at least one of a first radio network and a second radio network that permit the UE to make an initial access to one of the first and second radio networks;
   receiving from the radio network node one or more network selection parameters based on one or more quality factors that depend on an uplink channel quality associated with one or both of the first and second radio networks, the one or more network selection parameters comprising a threshold or an offset;

using the one or more network selection parameters to select one of first and second radio networks for subsequent access;

accessing the selected radio network.

10. The method in claim 9, further comprising initially accessing one of the first and second radio networks prior to receiving from the radio network node one or more network selection parameters.

11. A user equipment, UE, configured to communicate over a radio interface with a radio network node, the UE comprising:

radio circuitry configured to:
receive from the radio network node default network access signals for at least one of a first radio network and a second radio network that permit the UE to make an initial access to one of the first and second radio networks;
receive from the radio network node one or more network selection parameters based on one or more quality factors that depend on an uplink channel quality associated with one or both of first and second networks, the one or more network selection parameters comprising a threshold or an offset, and one or more data processors, coupled to the radio circuitry, configured to:
use the one or more network selection parameters to select one of the first and second radio networks for subsequent access; and
access the selected radio network.

12. The UE in claim 11, wherein the radio circuitry is configured to initially access the one of first and second radio networks prior to receiving the one or more network selection parameters.

13. A system in which at least one user equipment, UE, configured to communicate over a radio interface with at least one radio network node, said UE configured to select one of first and second radio networks, the system comprising:

the radio network node configured to communicate default network access signals for at least one of the first and second radio networks that permit the UE to make an initial access to one of the first and second radio networks;

the radio network node configured to estimate one or more quality factors that depend on an uplink channel quality for one or both of the first and second networks;

the radio network node configured to determine one or more network selection parameters based on the estimated one or more quality factors, the one or more network selection parameters comprising a threshold or an offset; and the radio network node configured to communicate the one or more network selection parameters comprising the threshold or offset to the UE for the UE to select one of the first and second radio networks for subsequent access by the UE.

14. The system in claim 13, wherein the first radio network and the second radio network are different radio networks that use different base stations.

15. The system in claim 13, wherein the first radio network is a first mode of operation of a common radio network and the second radio network is a second different mode of operation of the common radio network.

16. The system in claim 13, wherein each of the first and second radio networks includes a respective system or a respective mode of operation having a corresponding time and frequency synchronization.

17. The system in claim 13, wherein the first and second radio networks are different radio networks that share one or more of a same base station, a same radio access technology, a same radio frequency bandwidth, or a same signaling format.

18. The system in claim 13, wherein the radio network node is configured to estimate the one or more of the quality factors based on the load of one or both of the first and second radio networks; or the radio network node configured to estimate the one or more of the quality factors based on the expected UE behavior; or the radio network node is configured to estimate the one or more of the quality factors based on the uplink quality of one or both of the first and second radio networks.

19. The system in claim 13, wherein the one or more network selection parameters further comprise one or more of: a setting, a rule, an initial power target value, a power increase value per access attempt, a back-off time, a persistence parameter, an offset, or a threshold.

20. The system in claim 13, wherein the first network is a radio legacy network and the second radio network is a deep coverage network for Machine Type Communications (MTC) traffic.

* * * * *